(12) United States Patent
Jian et al.

(10) Patent No.: US 11,984,670 B2
(45) Date of Patent: May 14, 2024

(54) WIRELESS ELECTRONIC COMMUNICATIONS DEVICE

(71) Applicant: VIVO MOBILE COMMUNICATION CO., LTD., Chang'an Dongguan (CN)

(72) Inventors: Xianjing Jian, Chang'an Dongguan (CN); Huan-Chu Huang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 417 days.

(21) Appl. No.: 17/360,590

(22) Filed: Jun. 28, 2021

(65) Prior Publication Data

US 2021/0328349 A1 Oct. 21, 2021

Related U.S. Application Data

(63) Continuation of application No. PCT/CN2019/126199, filed on Dec. 18, 2019.

(30) Foreign Application Priority Data

Dec. 28, 2018 (CN) .......................... 201811629703.5

(51) Int. Cl.
*H01Q 9/04* (2006.01)
*H01Q 1/24* (2006.01)
*H04M 1/02* (2006.01)

(52) U.S. Cl.
CPC .......... *H01Q 9/0421* (2013.01); *H01Q 1/243* (2013.01); *H04M 1/0262* (2013.01); *H04M 1/0274* (2013.01); *H04M 1/0277* (2013.01)

(58) Field of Classification Search
CPC ... H01Q 9/0421; H01Q 1/243; H04M 1/0262; H04M 1/0274; H04M 1/0277
See application file for complete search history.

(56) References Cited

U.S. PATENT DOCUMENTS

| 8,552,913 B2 | 10/2013 | Ayatollahi et al. |
| 2013/0194138 A1 | 8/2013 | Hammond |
| 2014/0266928 A1 | 9/2014 | Gummalla |

(Continued)

FOREIGN PATENT DOCUMENTS

| CN | 102769180 B | * | 5/2015 |
| CN | 205159516 U | | 4/2016 |

(Continued)

OTHER PUBLICATIONS

PCT International Search Report and Written Opinion related to Application No. PCT/CN2019/126199; dated Mar. 18, 2020.

(Continued)

*Primary Examiner* — Henry Luong
(74) *Attorney, Agent, or Firm* — von Briesen & Roper, s.c.

(57) ABSTRACT

This application provides a wireless electronic communications device, including: a metal frame on which a first antenna and a second antenna are disposed, where a first preset distance is spaced between the first antenna and the second antenna, and a feeding structure is disposed on each of the first antenna and the second antenna; and a slot structure disposed between the first antenna and the second antenna, where an extension distance of the slot structure in a width direction of the metal frame is less than a width of the metal frame.

14 Claims, 10 Drawing Sheets

(56) References Cited

U.S. PATENT DOCUMENTS

| | | | |
|---|---|---|---|
| 2015/0200463 A1 | 7/2015 | Heikura et al. | |
| 2015/0372372 A1 | 12/2015 | Lee et al. | |
| 2016/0233581 A1 | 8/2016 | Kim et al. | |
| 2018/0026344 A1 | 1/2018 | Lee et al. | |
| 2018/0026351 A1 | 1/2018 | Tsai et al. | |
| 2018/0375197 A1* | 12/2018 | Liu | H01Q 13/10 |
| 2019/0229429 A1 | 7/2019 | Wu | |

FOREIGN PATENT DOCUMENTS

| | | | |
|---|---|---|---|
| CN | 106025545 | A | 10/2016 |
| CN | 206148615 | U | 5/2017 |
| CN | 106876897 | A | 6/2017 |
| CN | 106935962 | A | 7/2017 |
| CN | 107425284 | A | 12/2017 |
| CN | 108281753 | A | 7/2018 |
| CN | 108417966 | A | 8/2018 |
| CN | 108736132 | A | 11/2018 |
| CN | 109586031 | A | 4/2019 |

OTHER PUBLICATIONS

Chinese First Office Action related to Application No. 201811629703.5; dated Mar. 30, 2020.
The Extended European Search Report related to Application No. 19905942.9; dated Jan. 25, 2022.

* cited by examiner

FIG. 15 ional Application No. PCT/CN2019/126199 filed on Dec. 18, 2019, which claims priority to Chinese Patent Application No. 201811629703.5 filed in China on Dec. 28, 2018, both disclosures of which are incorporated herein by reference in their entireties.

WIRELESS ELECTRONIC COMMUNICATIONS DEVICE

CROSS REFERENCE

This application is a continuation application of International Application No. PCT/CN2019/126199 filed on Dec. 18, 2019, which claims priority to Chinese Patent Application No. 201811629703.5 filed in China on Dec. 28, 2018, both disclosures of which are incorporated herein by reference in their entireties.

TECHNICAL FIELD

The present disclosure relates to the field of communications technologies, and in particular, to a wireless electronic communications device.

BACKGROUND

A new frequency band is added to a fifth-generation (5th-Generation, 5G) mobile communications technology, and for a higher data transmission rate, higher-order multiple-input multiple-output (Multiple-Input Multiple-Output, MIMO) such as 4*4 MIMO needs to be supported, and even 8*8 MIMO may need to be supported in the future. Therefore, a quantity of antennas required by a wireless electronic communications device is significantly increased, and even more than ten antennas are reached. So many antennas are integrated into the wireless electronic communications device, so that isolation between antennas becomes an obvious challenge, and radiation efficiency of each antenna is reduced because the isolation between antennas deteriorates, and an indicator of an envelope correlation coefficient (Envelope Correlation Coefficient, ECC) is degraded, thereby reducing a channel capacity of MIMO and a system throughput. Eventually, wireless communication experience and product competitiveness are reduced.

In a related technology, there are the following several methods for resolving isolation between two antennas:
1. Increase a spatial distance between the two antennas, to reduce the isolation.
2. Directly make a slot on a floor structure to prevent a floor current from flowing from one antenna port to another antenna port, thus suppressing mutual coupling of the floor current and improving the isolation between the antennas.
3. A metal line or a neutralization line is connected between proper positions of two antenna radiators, to connect the two antennas, so that an antenna 1 injects a partial current into an antenna 2 by using the neutralization line, and the antenna 2 injects a partial current into the antenna 1 by using the neutralization line. If directions of the two currents are opposite to each other, the two currents counteract each other, so that the isolation between the two antennas is improved.

However, the methods for resolving the isolation between the antennas in the related technology have the following defects:
1. The method for reducing the isolation by increasing the spatial distance between two antennas is usually not suitable for designing an antenna of a 5G wireless electronic communications device. Because a size of the wireless electronic communications device cannot be significantly increased, it is difficult to carry a relatively large quantity of antennas. If a distance between the antennas is increased, an overall size of the wireless electronic communications device is increased, and competitiveness is lost.
2. The method for improving the isolation between antennas by making a slot on the floor structure to prevent the floor current from flowing from one antenna port to another antenna port damages integrity of the floor structure. Because there is still cabling required by other functions on the floor, it is usually difficult to make a slot of a specific size at a specific position based on a requirement of antenna design. Therefore, practical value of the project is relatively low.
3. For the method for improving the isolation between two antennas by connecting a metal line or a neutralization line between proper positions of two antenna radiators, to connect the two antennas, so that an antenna 1 injects a partial current into an antenna 2 by using a neutralization line, and the antenna 2 injects a partial current into the antenna 1 by using the neutralization line, and the two currents counteract each other when directions are opposite to each other, the method is usually applicable to improvement of isolation of narrow-band antennas, and has an unobvious effect for improving isolation of multi-frequency or wide-frequency.

In summary, in the method for resolving the isolation between antennas in the related technology, there are problems that the size of the wireless electronic communications device is increased, practical value is low, or an isolation improvement effect is not obvious.

SUMMARY

Embodiments of the present disclosure provide a wireless electronic communications device, to resolve problems that a size of the wireless electronic communications device is increased, practical value is low, or an isolation improvement effect is not obvious.

To resolve the foregoing problems, the embodiments of the present disclosure are implemented as follows:

An embodiment of the present disclosure provides a wireless electronic communications device, including:
 a metal frame; where
 a first antenna and a second antenna are disposed on the metal frame, a first preset distance is spaced between the first antenna and the second antenna, and a feeding structure is disposed on each of the first antenna and the second antenna; and
 a slot structure disposed between the first antenna and the second antenna to improve isolation between the first antenna and the second antenna, where an extension distance of the slot structure in a width direction of the metal frame is less than a width of the metal frame.

In the technical solutions of the present disclosure, a first antenna and a second antenna are designed on a metal frame, and a slot structure for improving isolation between the two antennas is disposed between the two antennas, to prevent current flow between the two antennas, so that the isolation between the two antennas is improved. Therefore, mutual impact between the antennas is reduced, and a packet correlation coefficient indicator can be improved, so that a channel capacity of multiple-input multiple-output and a transmission rate are improved, thereby ensuring wireless communication experience of a user and product competitiveness.

BRIEF DESCRIPTION OF DRAWINGS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
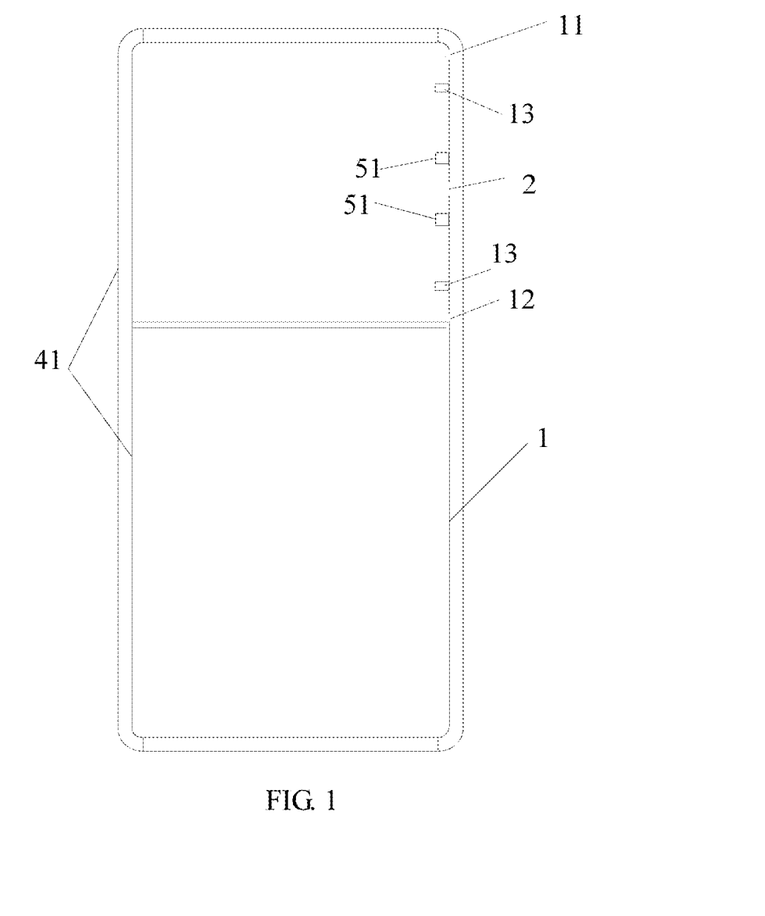
FIG. 1 is a schematic structural diagram 1 of a wireless electronic communications device according to an embodiment of the present disclosure.
Figure 2:
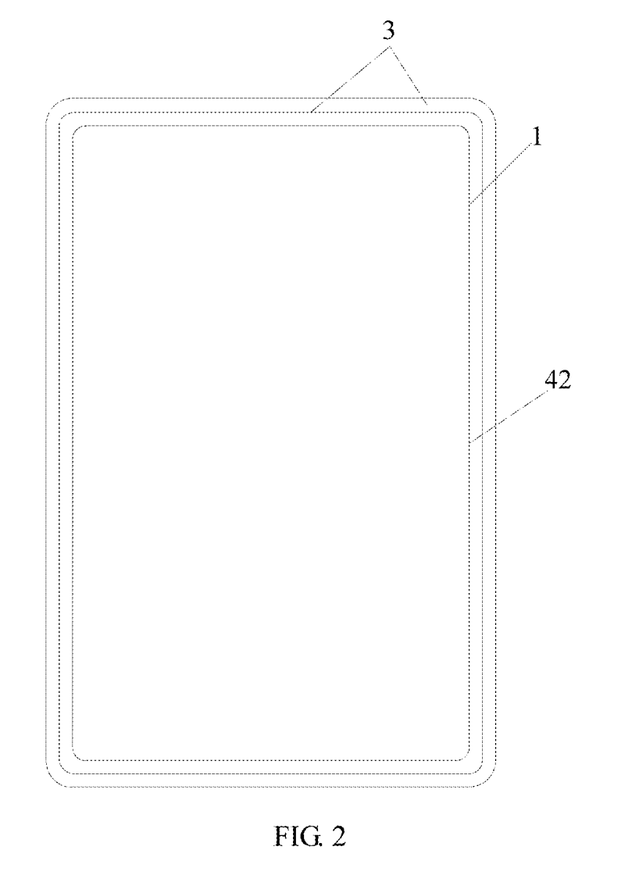
FIG. 2 is a schematic structural diagram 2 of a wireless electronic communications device according to an embodiment of the present disclosure.
Figure 3:
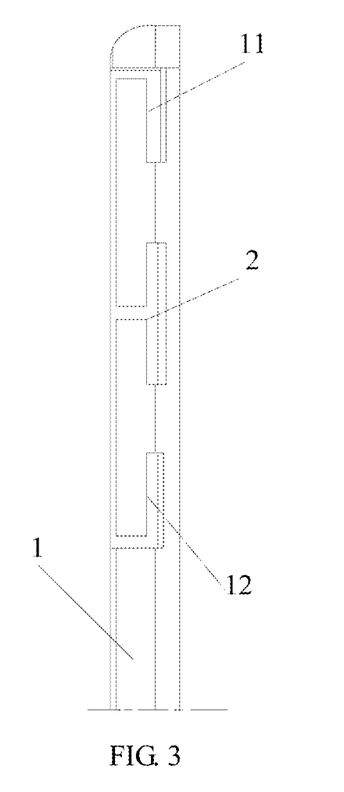
FIG. 3 is a schematic diagram in which a first opening slot, a second opening slot, and a slot structure are disposed on a metal frame according to an embodiment of the present disclosure.

An embodiment of the present disclosure provides a wireless electronic communications device. As shown in FIG. 1 and FIG. 3, the wireless electronic communications device includes:

a metal frame 1, where a first antenna and a second antenna are disposed on the metal frame 1, a first preset distance is spaced between the first antenna and the second antenna, and a feeding structure is disposed on each of the first antenna and the second antenna; and a slot structure 2 disposed between the first antenna and the second antenna, where an extension distance of the slot structure 2 in a width direction of the metal frame 1 is less than a width of the metal frame 1.

The wireless electronic communications device provided in this embodiment of the present disclosure includes the metal frame 1, where the metal frame 1 may be a metal middle frame, or may include a metal middle frame and a housing that is integrally connected to the metal middle frame. The metal frame 1 includes four sidewalls. The first antenna and the second antenna are disposed on the metal frame 1, and the first preset distance is set between the first antenna and the second antenna.

The first antenna and the second antenna are connected to a main board feed by using a metal plate 13 used for feeding. The first antenna and the second antenna may be connected to a same main board feed. In this case, the first antenna and the second antenna form different antennas in an antenna array, or the first antenna and the second antenna are connected to different main board feeds. In this case, the first antenna and the second antenna form different antennas. A corresponding feeding structure is formed on positions that are on the first antenna and the second antenna and that are connected to the main board feed.

The slot structure 2 for improving isolation between the first antenna and the second antenna is disposed between the first antenna and the second antenna, where the slot structure 2 extends a certain distance in the width direction of the metal frame 1, and the extension distance is less than the width of the metal frame 1, which may be different from a structural design of a slot in a solution in a related technology, thereby improving structural strength and reliability.

The width of the metal frame 1 may be understood as a direction of a connection line from a first side to a second side of the metal frame 1, the first side of the metal frame 1 is on a same side as a display screen, and the second side of the metal frame 1 is on a same side as a battery.

In this embodiment of the present disclosure, a first antenna and a second antenna are designed on a metal frame, and a slot structure for improving isolation between the two antennas is disposed between the two antennas, to prevent current flow between the two antennas, so that the isolation between the two antennas is improved. Therefore, mutual impact between the antennas is reduced, and a packet correlation coefficient indicator can be improved, so that a channel capacity of multiple-input multiple-output and a transmission rate are improved, thereby ensuring wireless communication experience of a user and product competitiveness.

In this embodiment of the present disclosure, as shown in FIG. 1 and FIG. 3, a first opening slot 11 is disposed on the metal frame 1, and a first cantilever part that is of the metal frame 1 and that corresponds to the first opening slot 11 is a first antenna radiation arm; and a second opening slot 12 is disposed on the metal frame 1, and a second cantilever part that is of the metal frame 1 and that corresponds to the second opening slot 12 is a second antenna radiation arm. The first antenna radiation arm is a component part of the first antenna, and a second antenna radiation arm is a component part of the second antenna.

The first opening slot 11 and the second opening slot 12 are disposed on the metal frame 1, and a shape corresponding to the first opening slot 11 and a shape corresponding to the second opening slot 12 may be the same or different. The first cantilever part that is of the metal frame 1 and that corresponds to the first opening slot 11 is the first antenna radiation arm, and the second cantilever part that is of the metal frame 1 and that corresponds to the second opening slot 12 is the second antenna radiation arm. The first preset distance between the first antenna and the second antenna is a nearest distance between the first opening slot 11 and the second opening slot 12 on the sidewall of the metal frame 1.

In this embodiment of the present disclosure, as shown in FIG. 1 to FIG. 3 and FIG. 5 to FIG. 7, the wireless electronic communications device further includes a display screen, a main floor, a battery, and a rear cover 3 covering the slot structure 2, the first opening slot 11, and the second opening slot 12. A part that is of the rear cover 3 and that covers the slot structure 2, the first opening slot 11, and the second opening slot 12 is a non-metal material.

The display screen, the main floor, and the battery are all disposed inside the metal frame 1, and the display screen, the main floor, and the battery may be arranged inside the metal frame 1 in sequence, in other words, the display screen is located on one side of the metal frame 1, the battery is located on the other side of the metal frame 1, and a width direction of the metal frame 1 is a direction of a connection line between one side of the metal frame 1 and the other side.

The rear cover 3 may cover the slot structure 2, the first opening slot 11, and the second opening slot 12 that are disposed on the metal frame 1. By covering the slot structure 2, the first opening slot 11, and the second opening slot 12, the slot structure 2, the first opening slot 11, and the second opening slot 12 are not externally visible, thereby improving product competitiveness.

Further, because the rear cover 3 may shield the slot structure 2, the first opening slot 11, and the second opening slot 12 that are disposed on the metal frame 1, it can be ensured that the slot structure 2, the first opening slot 11, and the second opening slot 12 are not directly exposed on an external surface, and a user is not in direct contact with an antenna slot in a handheld state, thereby reducing impact on antenna performance in the handheld state, and improving wireless communication quality and user experience.

The part that is of the rear cover 3 and that covers the slot structure 2, the first opening slot 11, and the second opening slot 12 is a non-metal material, and other parts may be metal materials. The non-metal material part may be specifically glass, ceramic, plastic, or the like, and may be designed as a variety of solitude, and can be easily conformed to an antenna design, to improve a sense of hand quality and beauty of a product, thereby improving product competitiveness.

Figure 4:
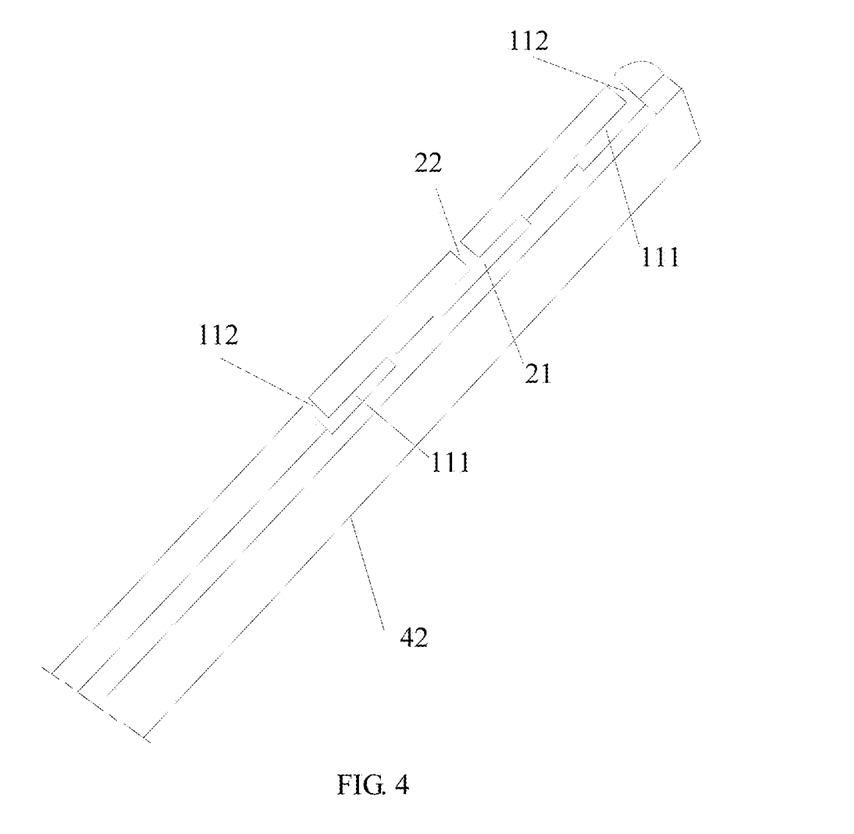
FIG. 4 is a schematic diagram of a first opening slot, a second opening slot, and a slot structure according to an embodiment of the present disclosure.
Figure 5:
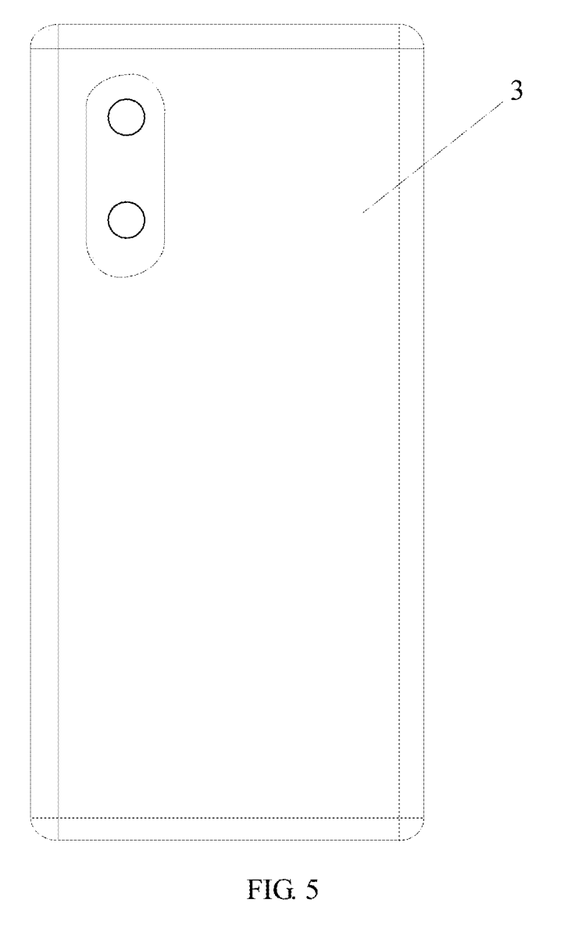
FIG. 5 is a schematic diagram of a rear cover according to an embodiment of the present disclosure.
Figure 6:
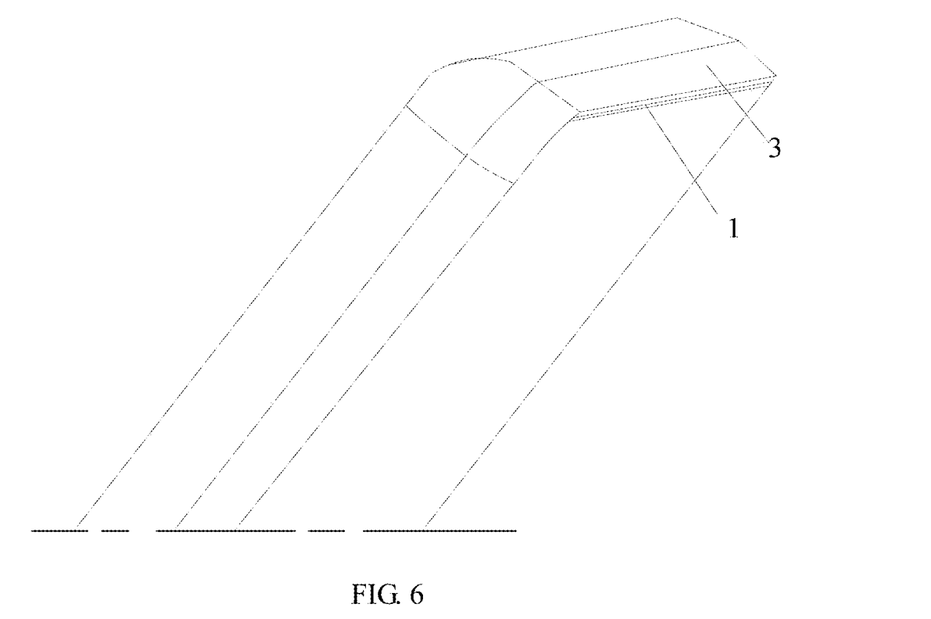
FIG. 6 is a schematic diagram 1 of cooperation between a rear cover and a metal frame according to an embodiment of the present disclosure.
Figure 7:
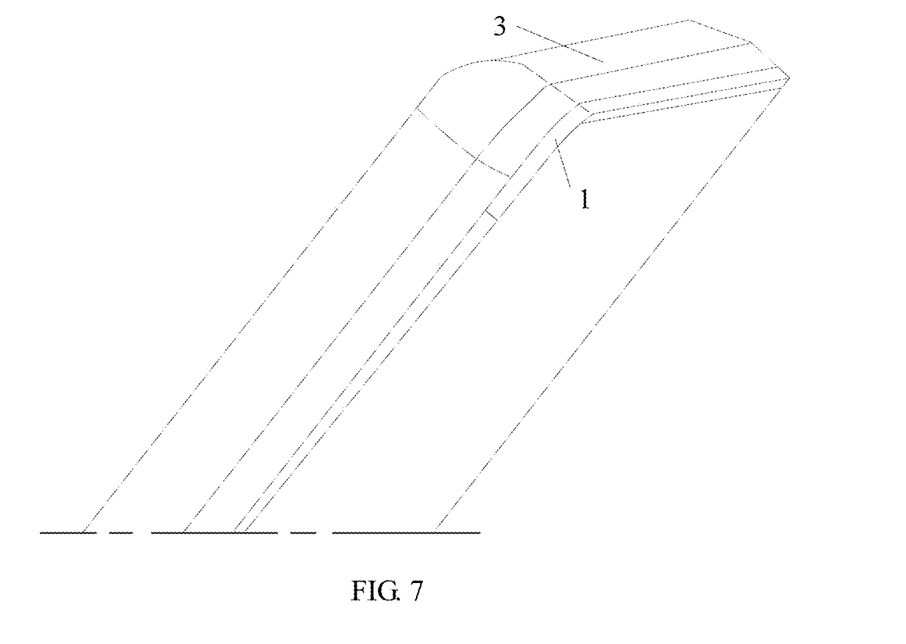
FIG. 7 is a schematic diagram 2 of cooperation between a rear cover and a metal frame according to an embodiment of the present disclosure.

In this embodiment of the present disclosure, as shown in FIG. 3 and FIG. 4, the slot structure 2 includes a first slot 21 that extends in a length direction of a first sidewall of the metal frame 1, and a second slot 22 that is not parallel to but is connected to the first slot 21, where the first slot 21 is less than a length of the first sidewall, and the second slot 22 is less than the width of the metal frame 1.

The slot structure 2 includes the first slot 21 and the second slot 22, where the slot structure 2 is disposed on the first sidewall of the metal frame 1, the first slot 21 extends in a length direction of the first sidewall, and a corresponding extension distance is less than a length of the first sidewall. The second slot 22 is not disposed in parallel to the first slot 21, and is connected to the first slot 21. A length of the second slot 22 is less than the width of the metal frame 1.

It should be noted that because the first slot 21 is connected to the second slot 22, a part that is of the first slot 21 and that is connected to the second slot 22 may form a common area between the first slot 21 and the second slot 22. A length of the first slot 21 includes a part corresponding to the common area in an extension direction of the first slot 21, and the length of the second slot 22 includes a part corresponding to the common area in an extension direction of the second slot 22.

The length corresponding to the second slot 22 of the slot structure 2 is set to be less than the width of the metal frame 1, to avoid forming a slot on the metal frame 1, and ensure structural strength of the metal frame 1. In this way, a whole frame structure is stronger and more reliable than a structure in the related technology.

In this embodiment of the present disclosure, the first opening slot 11, the second opening slot 12, and the slot structure 2 are disposed on a same sidewall or different sidewalls, and extension distances of both the first opening slot 11 and the second opening slot 12 in a length of any sidewall are less than a second preset distance The slot structure 2 may be disposed on the first sidewall. Correspondingly, the first opening slot 11 and the second opening slot 12 may also be disposed on the first sidewall; or the first opening slot 11 may be disposed on the first sidewall, and the second opening slot 12 is not disposed on the first sidewall; or neither the first opening slot 11 nor the second opening slot 12 is disposed on the first sidewall.

For the first opening slot 11 and the second opening slot 12, both an extension distance of the first opening slot 11 in a length of any sidewall and an extension distance of the second opening slot 12 in a length of any sidewall are less than the second preset distance. The second preset distance herein is preset. For example, the second preset distance may be a length corresponding to a sidewall of the metal frame 1 with a relatively short length, and may be specifically set based on a size of the metal frame 1. Details are not described herein again.

In this embodiment of the present disclosure, as shown in FIG. 3 and FIG. 4, the first opening slot 11 and the second opening slot 12 each include a third slot 111 that extends in a length direction of the sidewall, and a fourth slot 112 that is not parallel to but is connected to the third slot 111. A length of the third slot 111 is less than the second preset distance, and a length of the fourth slot 112 is less than the width of the metal frame 1.

The first opening slot 11 and the second opening slot 12 each include the third slot 111 and the fourth slot 112. For the first opening slot 11, the third slot 111 extends along a length direction of a sidewall on which the first opening slot 11 is located, and a corresponding extension length is less than the second preset distance. For the second opening slot 12, the third slot 111 extends along a length direction of a sidewall on which the second opening slot 12 is located, and a corresponding extension length is less than the second preset distance.

The fourth slot 112 is not disposed in parallel to the third slot 111, and is connected to the third slot 111. A length of the fourth slot 112 is less than the width of the metal frame 1.

It should be noted that because the third slot 111 is connected to the fourth slot 112, a part that is of the third slot 111 and that is connected to the fourth slot 112 may form a common area between the third slot 111 and the fourth slot 112. A length of the third slot 111 includes a part corresponding to the common area in an extension direction of the third slot 111, and the length of the fourth slot 112 includes a part corresponding to the common area in an extension direction of the fourth slot 112.

The length corresponding to the fourth slot 112 of the first opening slot 11 and the second opening slot 12 is set to be less than the width of the metal frame 1, to avoid forming a slot on the metal frame 1, and ensure structural strength of the metal frame 1. In this way, a whole frame structure has higher strength and higher reliability than a structure in the related technology.

In this embodiment of the present disclosure, as shown in FIG. 1, FIG. 2, FIG. 3, and FIG. 4, the second slot 22 and the fourth slot 112 extend from a first side to a second side edge of the metal frame 1. The second side is a side that is of the metal frame 1 and that is on the same side as the display screen, and the first side is opposite to the second side.

The metal frame 1 includes the first side and the second side that are disposed opposite to each other, where the second side and the display screen are located on the same side, and the first side and the battery are located on the same side. Both the second slot 22 and the fourth slot 112 extend from the first side of the metal frame 1, and a corresponding extension distance is less than a distance between the first side and the second side. The distance between the first side and the second side herein is the width of the metal frame 1.

The main floor is connected to an inner wall of the metal frame 1. In a width direction of the metal frame 1, the main floor divides the metal frame 1 into a first metal frame 41 and a second metal frame 42, where the first side is located in the first metal frame 41, the second side is located in the second metal frame 42, and the first slot 21 and the third slot 111 are located on the first metal frame 41. The length of the second slot 22 and the length of the fourth slot 112 are less than or equal to a width of the first metal frame 41. The main floor is a main board or a metal isolation board. The main floor disposed inside the metal frame 1 may be integrally connected to four inner walls of the metal frame 1. In this manner, it can be ensured that the main floor and the metal frame 1 are securely connected, and a thickness of the main floor is less than the width of the metal frame 1. By disposing the main floor integrally connected to the inner wall of the metal frame 1, the metal frame 1 may be divided into the first metal frame 41 and the second metal frame 42 in the width direction of the metal frame 1. Sizes of the first metal frame 41 and the second metal frame 42 are not further limited herein.

The first side of the metal frame 1 is located on the first metal frame 41, and correspondingly, the second side of the corresponding metal frame 1 is located on the second metal frame 42. Because the second side is a side that is of the metal frame 1 and that is on the same side as the display screen, the display screen may be disposed on the second metal frame 42, and correspondingly, the battery is disposed on the first metal frame 41.

A first end face of the main floor may cooperate with the first metal frame 41 to form first accommodation space, and a second end face of the main floor may cooperate with the second metal frame 42 to form second accommodation space. Because of setting of the main floor, a sum of a depth of the first accommodation space (the width of the first metal frame 41) and a depth of the second accommodation space (the width of the second metal frame 42) is less than the width of the metal frame 1. The display screen is disposed in the second accommodation space, and correspondingly, the battery is disposed in the first accommodation space.

Both the first slot 21 and the second slot 22 that are included in the slot structure 1 are located on the first metal frame 41, and both the third slot 111 and the fourth slot 112 that are included in the first opening slot 11 and the second opening slot 12 are also located on the first metal frame 41.

The first slot 21 is disposed on the first metal frame 41, and may be perpendicular to a width direction of the first metal frame 41. The second slot 22 extends from the first side of the metal frame 1, and a corresponding extension distance is less than or equal to the width of the first metal frame 41.

The third slot 111 is disposed on the first metal frame 41, and may be perpendicular to the width direction of the first metal frame 41. The fourth slot 112 extends from the first side of the metal frame 1, and a corresponding extension distance is less than or equal to the width of the first metal frame 41.

The foregoing forms of setting the second slot 22 and the fourth slot 112 can ensure integrity of an end face on which the main floor cooperates with the second accommodating space, so that a whole frame structure has higher strength and higher reliability than the structure in the related technology, and more slots can be opened, and structural design of multiple antennas is ensured without affecting structural strength and appearance.

The main floor is a main board or a metal isolation board. For a case in which the main floor is a main board, the metal frame 1 is divided into the first metal frame 41 and the second metal frame 42 in the width direction by connecting the main board to the inner wall of the metal frame 1. The first end face of the main board may cooperate with the first metal frame 41 to form the first accommodation space, the second end face of the main board may cooperate with the second metal frame 42 to form the second accommodation space, the display screen is disposed in the second accommodation space, and the battery is disposed in the first accommodation space. By connecting the main board to the metal frame 1, the main board can be grounded, and the display screen can be separated from the slot, thereby reducing impact exerted on the antenna by the display screen, especially an extreme full screen.

In addition, because an end face that is of the main board and that is attached to the display screen remains complete, radiation of a side of the antenna toward the display screen side is blocked in a relatively high proportion compared with a design in a related technology in which a slot is disposed on an appearance surface. Therefore, a radiation direction is basically not toward a user head, and a specific absorption ratio (Specific Absorption Ratio, SAR) of the head can be effectively reduced, thereby effectively improving human body security compliance.

For a case in which the main floor is a metal isolation board, a cooperation structure of the metal isolation boar and the metal frame 1 may be considered as: respectively opening a groove on two end surfaces of a metal plate body, and reserving a plate body with a specific thickness between the two grooves. The metal isolation board is connected to the inner wall of the metal frame 1, so that the metal frame 1 is divided into the first metal frame 41 and the second metal frame 42 in the width direction. A first end face of the metal isolation board may cooperate with the first metal frame 41 to form first accommodation space, a second end face of the metal isolation board may cooperate with the second metal frame 42 to form second accommodation space, the display screen is disposed in the second accommodation space, and the battery may be disposed in the first accommodation space. In this case, the first accommodation space may correspond to two areas, the first area is used to accommodate the main board, and the second area is used to accommodate the battery. A spring plate structure may be disposed on the main board, and the metal plate 13 connected to the first antenna and the second antenna may be disposed on the metal frame 1 corresponding to the first area, and is connected to a mainboard feed on the main board by using the spring plate structure. A battery compartment is formed in the second area, and is configured to accommodate a battery structure. The metal plate 13 and the spring plate structure may be in direct contact or may be in contact by using a screw.

By setting a size of the second slot 22 and a size of the fourth slot 112, an end face that is of the metal isolation board and that cooperates with the display screen remains complete and can serve as the ground of an antenna structure, to isolate the display screen from the slot, thereby reducing impact exerted on the antenna by the display screen, especially an extreme full screen. In addition, because an end face that is of the metal isolation board and that is attached to the display screen remains complete, radiation of a side of the antenna toward the display screen side is blocked in a relatively high proportion compared with a design in a related technology in which a slot is disposed on an appearance surface. Therefore, a radiation direction is basically not toward a user head, and an SAR of the head can be effectively reduced, thereby effectively improving human body security compliance.

It should be noted that, as shown in FIG. 1, FIG. 2, FIG. 3, FIG. 5, FIG. 6, and FIG. 7, when the rear cover 3 covers the slot structure 2, the first opening slot 11, and the second opening slot 12, an extension length of the rear cover 3 in the width direction of the metal frame 1 may be equal to the width of the metal frame 1; or an extension length of the rear cover 3 in the width direction of the metal frame 1 is greater than or equal to the width of the first metal frame 41 and is less than the width of the metal frame 1.

By setting the extension length of the rear cover 3 in the width direction of the metal frame 1 to be equal to the width of the metal frame 1, protection of the rear cover 3 on the metal frame 1 can be implemented, and no slot can be seen externally, thereby improving beauty of a product, and improving product competitiveness.

By setting the extension length of the rear cover 3 in the width direction of the metal frame body 1 to be greater than or equal to the width of the first metal frame 41 and less than the width of the metal frame 1, the slot can be covered, and a part of the metal frame body 1 is exposed on an appearance surface. The rear cover 3 shields the slot on the metal frame 1, so that the slot is not directly exposed on the appearance surface, and the user is not in direct contact with an antenna slot in a handheld state, thereby reducing impact on antenna performance in the handheld state, improving wireless communication quality, and improving user experience.

A slot width corresponding to the first opening slot 11, a slot width corresponding to the second opening slot 12, and a slot width corresponding to the slot structure 2 may be 1.0 mm to 2.0 mm. Specifically, the slot width may be flexibly adjusted based on the thickness and the appearance design of the whole machine. Generally, a wider slot width leads to better antenna bandwidth and better efficiency. A non-metallic dielectric material can be filled in the slot, and generally, a dielectric material with a low dielectric constant and low loss can be selected.

In this embodiment of the present disclosure, as shown in FIG. 1, FIG. 3, and FIG. 4, the first opening slot 11 is an L-shaped opening slot or a T-shaped opening slot, the L-shaped opening slot corresponds to one first antenna radiation arm, and the T-shaped opening slot corresponds to two first antenna radiation arms. The second opening slot 12 is an L-shaped opening slot or a T-shaped opening slot, the L-shaped opening slot corresponds to one second antenna radiation arm, and the T-shaped opening slot corresponds to two second antenna radiation arms. The slot structure 2 is an L-shaped slot or a T-shaped slot.

The first opening slot 11 may be an L-shaped opening slot formed when ends of the third slot 111 and the fourth slot 112 are connected and perpendicular to each other, and the L-shaped opening slot may correspond to one first antenna radiation arm; or may be a T-shaped opening slot formed when an end of the fourth slot 112 is connected to and perpendicular to the middle of the third slot 111, and the T-shaped opening slot may correspond to two first antenna radiation arms.

The second opening slot 12 may be an L-shaped opening slot formed when ends of the third slot 111 and the fourth slot 112 are connected and perpendicular to each other, and the L-shaped opening slot may correspond to one second antenna radiation arm; or may be a T-shaped opening slot formed when an end of the fourth slot 112 is connected to and perpendicular to the middle of the third slot 111, and the T-shaped opening slot may correspond to two second antenna radiation arms.

If both the first opening slot 11 and the second opening slot 12 are L-shaped opening slots, the two third slots 111 may extend in a direction that is close to or away from each other, or forms of the two L-shaped opening slots are entirely the same (overlapping may be implemented after translation), for example, extend in a same direction on a same sidewall. The foregoing case is not further limited herein.

A radiation arm of the antenna is formed after a slot is opened on a side face the metal frame 1, so that an end face corresponding to the main floor that is entirely attached to the display screen serves as the ground of the antenna, thereby effectively isolating the display screen and reducing impact exerted on the antenna by the display screen.

The slot structure 2 may be an L-shaped slot or a T-shaped slot. Optionally, the slot structure 2 is a T-shaped slot. By setting the slot structure 2 to a T-shaped slot, a current in the first antenna can be prevented from flowing to the second antenna, and a current in the second antenna can be prevented from flowing to the first antenna, thereby further improving isolation between the two antennas.

Figure 8:
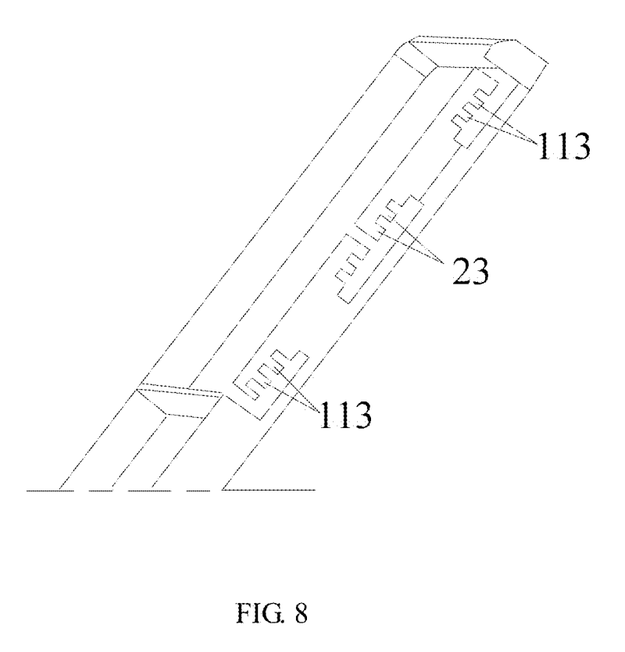
FIG. 8 is a schematic diagram of disposing a notch on a metal frame according to an embodiment of the present disclosure.

In this embodiment of the present disclosure, as shown in FIG. 1, FIG. 3, and FIG. 8, at least one first notch 113 is disposed on the first antenna radiation arm and/or the second antenna radiation arm, and at least one second notch 23 is disposed on an L-shaped arm or a T-shaped arm corresponding to the slot structure 2 on the metal frame 1. A plastic medium integrally connected to the metal frame 1 is disposed on at least one of the first opening slot 11, the second opening slot 12, the slot structure 2, the first notch 113, and the second notch 23.

If both the first opening slot 11 and the second opening slot 12 are L-shaped opening slots, at least one first notch 113 may be disposed on the first antenna radiation arm and/or the second antenna radiation arm. If both the first opening slot 11 and the second opening slot 12 are T-shaped opening slots, at least one first notch 113 may be disposed on the first antenna radiation arm and/or the second antenna radiation arm. If the first opening slot 11 is an L-shaped opening slot and the second opening slot 12 is a T-shaped opening slot, at least one first notch 113 may be disposed on the first antenna radiation arm and/or the second antenna radiation arm.

At least one second notch 23 is disposed on the L-shaped arm or the T-shaped arm corresponding to the slot structure 2 on the metal frame 1, and a plastic dielectric material may be filled in at least one of the first opening slot 11, the second opening slot 12, the slot structure 2, the first notch 113, and the second notch 23. The plastic dielectric material is formed integrally with the metal frame 1, so that a length of the slot can be reduced, and more antennas may be designed on a sidewall of the metal frame 1 having a same length. In addition, when the notch is disposed, the metal frame 1 is better engaged with the plastic, so that the metal frame 1 is formed integrally with the plastic.

Figure 10:
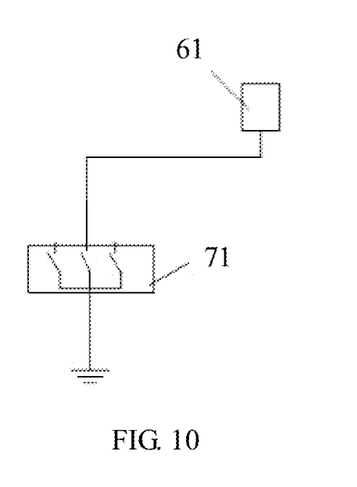
FIG. 10 is a schematic diagram of cooperation between a first mainboard spring plate and a first control switch according to an embodiment of the present disclosure.
Figure 11:
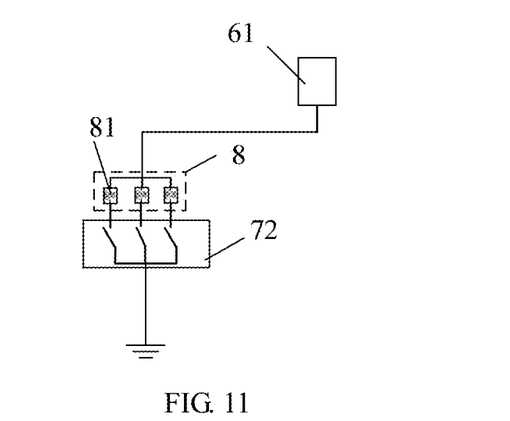
FIG. 11 is a schematic diagram of cooperation between a first mainboard spring plate and an inductor component and a second control switch according to an embodiment of the present disclosure.

In this embodiment of the present disclosure, as shown in FIG. 1, FIG. 10, and FIG. 11, the L-shaped arm or the T-shaped arm that is corresponding to the slot structure 2 on the metal frame 1 is connected to a first mainboard spring plate 61 by using a first connection structure 51, the first mainboard spring plate 61 is grounded by using a first control switch 71, or the first mainboard spring plate 61 is connected to an inductor component 8. The inductor component 8 is grounded by using a second control switch 72. The inductor component 8 includes at least one inductor 81. When there are multiple inductors 81, the multiple inductors 81 are connected in parallel.

The L-shaped arm corresponding to the slot structure 2 may be connected to the first mainboard spring plate 61 by using the first connection structure 51 (which may be a metal strip), and two of T-shaped arms corresponding to the slot structure 2 may be separately connected to two first mainboard spring plates 61 by using the first connection structure 51 (which may be a metal strip), in other words, each of the T-shaped arms is separately connected to one first mainboard spring plate 61.

The first mainboard spring plate 61 may be directly grounded by using the first control switch 71, or may be grounded by using the second control switch 72 after the inductor component 8 is connected. The first control switch 71 and the second control switch 72 herein may be PIN diodes, and the inductor component 8 may include at least one inductor 81. When there are multiple inductors 81, multiple inductors 81 are disposed in parallel, and each inductor 81 may be controlled by the second control switch 72. By controlling each inductor 81 by using the second control switch 72, whether the inductor 81 is connected to a circuit can be controlled, thereby changing an inductor value in the circuit. In the foregoing implementation process, an equivalent electrical length of the T-shaped arm or the L-shaped arm may be changed through on or off of the switch, so that isolation between multiple frequency bands can be improved.

Figure 9:
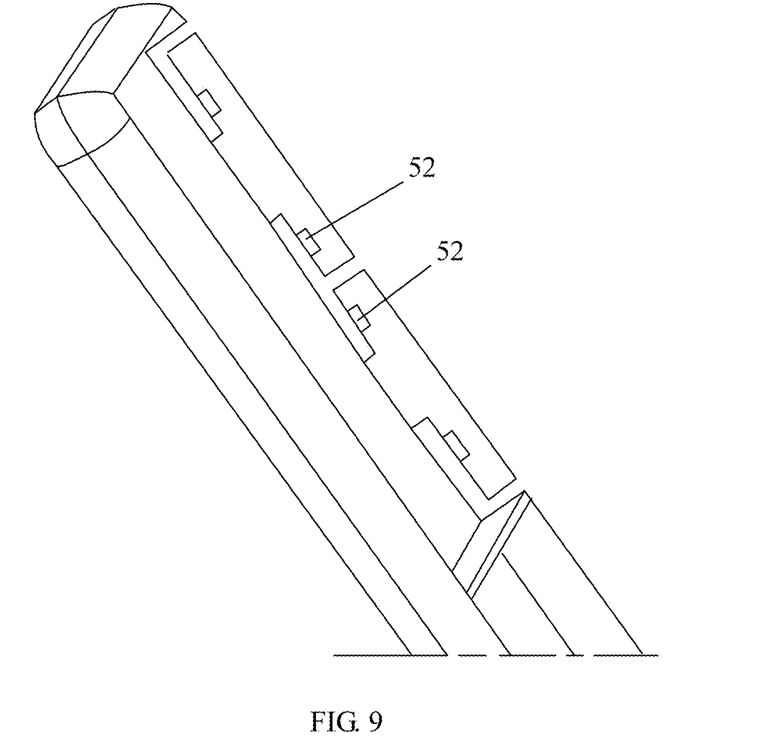
FIG. 9 is a schematic diagram of disposing a connection structure on a T-shaped arm according to an embodiment of the present disclosure.
Figure 12:
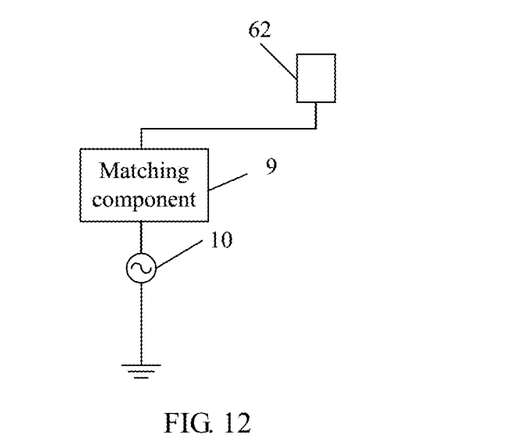
FIG. 12 is a schematic diagram of cooperation between a second mainboard spring plate and a matching component and a feed according to an embodiment of the present disclosure.

In this embodiment of the present disclosure, as shown in FIG. 9 and FIG. 12, the L-shaped arm or the T-shaped arm corresponding to the slot structure 2 on the metal frame 1 is connected to a second mainboard spring plate 62 by using a second connection structure 52. The second mainboard spring plate 62 is connected to a feed 10 by using a matching component 9, and the matching component 9 is a matching circuit or an impedance tunable component. The L-shaped arm corresponding to the slot structure 2 on the metal frame 1 forms one third antenna radiation arm, and the T-shaped arm corresponding to the slot structure 2 on the metal frame 1 forms two third antenna radiation arms.

The second connection structure 52 may be extended at a proper position of the L-shaped arm corresponding to the slot structure 2, and the second connection structure 52 is connected to the second mainboard spring plate 62. Two second connection structures 52 may be extended at a proper position of the T-shaped arm corresponding to the slot structure 2, and the two second connection structures 52 are separately connected to two second mainboard spring plates 62. The second connection structure 52 herein may be fixedly connected to each arm of the slot structure 2, and the second connection structure 52 may be a metal strip. Each second mainboard spring plate 62 may be connected to a feed 10 by using a matching circuit or an impedance tunable component, and the feed 10 may excite an arm of the slot structure 2 to generate a new frequency band antenna.

When the second connection structure 52 is at a first preset position on the third antenna radiation arm, the second connection structure 52, the third antenna radiation arm, the second mainboard spring plate 62, the matching component 9, and the feed 10 form a third antenna. When the second connection structure 52 is at a second preset position on the third antenna radiation arm, the second connection structure 52, the third antenna radiation arm, the second mainboard spring plate 62, the matching component 9, and the feed 10 form a fourth antenna.

If the second connection structure 52 is located at an end of each arm of the slot structure 2, a loop (loop) antenna is formed. If the second connection structure 52 is located at a non-end position of each arm of the slot structure 2, an inverted F antenna (Inverted F Antenna, IFA) is formed.

Optionally, if the slot structure 2 is a T-shaped slot, two feeders 10 may separately excite two radiation arms to generate a new antenna 1 and a new antenna 2. The two new antennas correspond to different frequency bands, and the frequency bands of the two new antennas are also different from frequency bands of the first antenna and the second antenna. The first antenna and the new antenna 1, the new antenna 1 and the new antenna 2, and the new antenna 2 and the second antenna are staggered from each other, thereby improving mutual isolation. In addition, even if new antennas separately generated by two third antenna radiation arms are loop antennas or IFA antennas, optionally, lengths of the two antennas (that is, two arms formed by a T-shaped slot) may be different, in other words, co-frequency proximity coupling is avoided to improve isolation.

Two new antennas are generated by adding an excitation signal source to a proper position of each arm of the slot structure 2, to implement multiplexing of a T-shaped slot structure, so that a new antenna can be added, and isolation between the first antenna and the second antenna can be improved.

The following briefly describes, by using a group of comparison data, a case in which isolation between antennas is improved by the wireless electronic communications device provided in the embodiments of the present disclosure.

Figure 13:
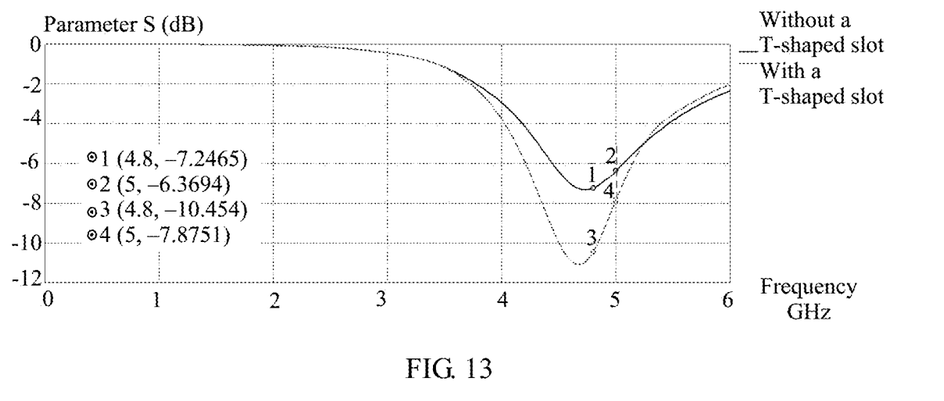
FIG. 13 is a schematic diagram of comparison between a first antenna parameter S with a T-shaped slot and a first antenna parameter S without a T-shaped slot according to an embodiment of the present disclosure.
Figure 14:
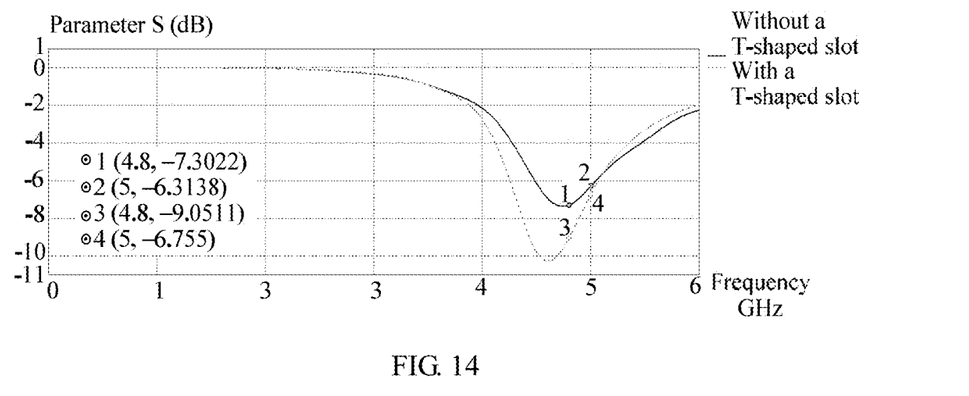
FIG. 14 is a schematic diagram of comparison between a second antenna parameter S with a T-shaped slot and a second antenna parameter S without a T-shaped slot according to an embodiment of the present disclosure.

FIG. 13 is a schematic diagram of comparison between a first antenna parameter S with a T-shaped slot and a first antenna parameter S without a T-shaped slot. FIG. 14 is a schematic diagram of comparison between a second antenna parameter S with a T-shaped slot and a second antenna parameter S without a T-shaped slot. It may be learned that after a T-shaped slot is added between the first antenna and the second antenna, the parameters S of the first antenna and the second antenna are improved.

Figure 15:
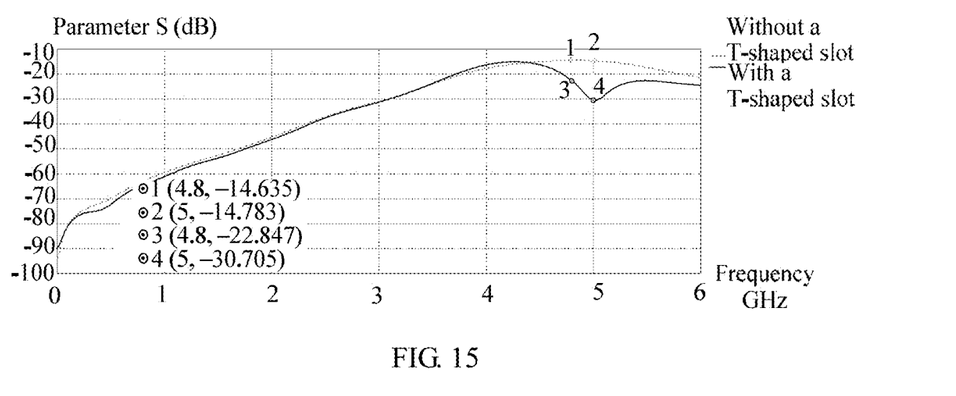
FIG. 15 is a diagram of comparison between isolation between a first antenna with a T-shaped slot and a second antenna without a T-shaped slot according to an embodiment of the present disclosure.

The first antenna and the second antenna may cover an n79 band (4.8 GHz to 5.0 GHz) of 5G FIG. 15 is a diagram of comparison between isolation between a first antenna with a T-shaped slot and a second antenna without a T-shaped slot. After the T-shaped slot is added, a current of the first antenna is prevented from flowing to the second antenna, and a current of the second antenna is prevented from flowing to the first antenna, so that isolation between the two antennas is improved by approximately 8 dB to 16 dB, thereby greatly reducing mutual impact between the first antenna and the second antenna.

In the wireless electronic communications device in this embodiment of the present disclosure, two antennas are designed on a metal frame, and a T-shaped slot is disposed between the two antennas, to prevent current flow between the two antennas, so that isolation between the two antennas is significantly improved. Therefore, mutual impact between the antennas is greatly reduced, and a packet correlation coefficient indicator can be significantly improved, so that a channel capacity of multiple-input multiple-output and a transmission rate are improved, thereby ensuring wireless communication experience of a user and product competitiveness.

The rear cover shields the slot on the metal frame, so that the slot is not directly exposed on the appearance surface, and the user is not in direct contact with an antenna slot in a handheld state, thereby reducing impact on antenna performance in the handheld state, improving wireless communication quality, and improving user experience. The rear cover is designed as a variety of solitude, and can be easily conformed to an antenna design, to improve a sense of hand quality and beauty of a product, thereby improving product competitiveness.

By multiplexing the slot structure, a new antenna can be added, and isolation between the first antenna and the second antenna can be improved. By setting a notch, a length of the slot can be reduced, and more antennas are designed on a sidewall of a metal frame of a same length. In addition, the metal frame is better engaged with the plastic, so that the metal frame is formed integrally with the plastic.

The wireless electronic communications device in this embodiment of the present disclosure may be a mobile phone, a tablet computer, a personal digital processor, an in-vehicle computer, a laptop computer, or a navigator.

The embodiments in this specification are described in a progressive manner. Each embodiment focuses on a difference from another embodiment. For a same or similar part of the embodiments, refer to each other.

Although some optional embodiments in the embodiments of this disclosure have been described, persons skilled in the art can make changes and modifications to these embodiments once they learn the basic inventive concept. Therefore, the following claims are intended to be construed as to cover optional embodiments and all changes and modifications falling within the scope of the embodiments of this disclosure.

Finally, it should be further noted that in this specification, relationship terms such as first and second are merely used to distinguish one entity or operation from another, and do not necessarily require or imply that there is any such actual relationship or sequence between these entities or operations. In addition, the term "include", "including", or any other variant is intended to cover non-exclusive inclusion, so that a process, a method, an article, or a wireless electronic communications device that includes a series of elements includes not only those elements but also other elements that are not explicitly listed, or includes elements inherent to such a process, method, article, or wireless electronic communications device. In the absence of more restrictions, an element defined by the statement "including a . . . " does not exclude another same element in the process, the method, the article, or the wireless electronic communications device that includes the element.

The foregoing descriptions are optional implementations of the present disclosure. It should be noted that, for a person of ordinary skill in the art, improvements and ornaments may be made without departing from the principle of the present disclosure. The improvements and ornaments also fall within the protection scope of the present disclosure.

The invention claimed is:

1. A wireless electronic communications device, comprising:
    a metal frame; wherein
    a first antenna and a second antenna are disposed on the metal frame, a first preset distance is spaced between the first antenna and the second antenna, and a feeding structure is disposed on each of the first antenna and the second antenna; and
    a slot structure disposed between the first antenna and the second antenna, wherein an extension distance of the slot structure in a width direction of the metal frame is less than a width of the metal frame;
    wherein a first opening slot and a second opening slot are disposed on the metal frame;
    wherein the first opening slot and the second opening slot each comprise:
    a third slot extending along a length direction of the sidewall, and a fourth slot that is not parallel to but is connected to the third slot; wherein a length of the third slot is less than a second preset distance, and a length of the fourth slot is less than the width of the metal frame;
    wherein the slot structure comprises a first slot extending along a length direction of a first sidewall of the metal frame, and a second slot that is not parallel to but is connected to the first slot; wherein the first slot is less than a length of the first sidewall, and the second slot is less than the width of the metal frame;
    wherein the second slot is not connected to the third slot of the first opening slot and the third slot of the second opening slot.

2. The wireless electronic communications device according to claim 1, wherein
    a first cantilever part that is of the metal frame and that corresponds to the first opening slot is a first antenna radiation arm, and the first antenna radiation arm is a component part of the first antenna; and
    a second cantilever part that is of the metal frame and that corresponds to the second opening slot is a second antenna radiation arm, and the second antenna radiation arm is a component part of the second antenna.

3. The wireless electronic communications device according to claim 2, wherein the wireless electronic communications device further comprises:
    a display screen, a main ground board, a battery, and a rear cover covering the slot structure, the first opening slot, and the second opening slot; wherein
    a part that is of the rear cover and that covers the slot structure, the first opening slot, and the second opening slot is a non-metal material.

4. The wireless electronic communications device according to claim 1, wherein the first opening slot, the second opening slot, and the slot structure are disposed on a same sidewall or different sidewalls, and extension distances of both the first opening slot and the second opening slot in a length of any sidewall are less than the second preset distance.

5. The wireless electronic communications device according to claim 1, wherein the second slot and the fourth slot extend from a first side of the metal frame to a second side, the second side is a side that is of the metal frame and that is on a same side as the display screen, and the first side is opposite to the second side.

6. The wireless electronic communications device according to claim 5, wherein the main ground board is connected to an inner wall of the metal frame; and
   in a width direction of the metal frame, the main ground board divides the metal frame into a first metal frame and a second metal frame, the first side is located on the first metal frame, the second side is located on the second metal frame, and the first slot and the third slot are located on the first metal frame.

7. The wireless electronic communications device according to claim 6, wherein a length of the second slot and the fourth slot is less than or equal to a width of the first metal frame.

8. The wireless electronic communications device according to claim 7, wherein the main ground board is a main board or a metal isolation board.

9. The wireless electronic communications device according to claim 1, wherein
   the first opening slot is an L-shaped opening slot or a T-shaped opening slot, the L-shaped opening slot corresponds to one first antenna radiation arm, and the T-shaped opening slot corresponds to two first antenna radiation arms;
   the second opening slot is an L-shaped opening slot or a T-shaped opening slot, the L-shaped opening slot corresponds to one second antenna radiation arm, and the T-shaped opening slot corresponds to two second antenna radiation arms; and
   the slot structure is an L-shaped slot or a T-shaped slot.

10. The wireless electronic communications device according to claim 9, wherein
    at least one first notch is disposed on the first antenna radiation arm and/or the second antenna radiation arm, and at least one second notch is disposed on an L-shaped arm or a T-shaped arm corresponding to the slot structure on the metal frame.

11. The wireless electronic communications device according to claim 10, wherein
    a plastic medium integrally connected to the metal frame is disposed on at least one of the first opening slot, the second opening slot, the slot structure, the first notch, and the second notch.

12. The wireless electronic communications device according to claim 9, wherein an L-shaped arm or a T-shaped arm corresponding to the slot structure on the metal frame is connected to a first mainboard spring plate by using a first connection structure; and
    the first mainboard spring plate is grounded by using a first control switch; or the first mainboard spring plate is connected to an inductor component, the inductor component is grounded by using a second control switch, the inductor component comprises at least one inductor, and when there are multiple inductors, the multiple inductors are connected in parallel.

13. The wireless electronic communications device according to claim 9, wherein
    the L-shaped arm or the T-shaped arm corresponding to the slot structure on the metal frame is connected to a second mainboard spring plate by using a second connection structure;
    the second mainboard spring plate is connected to a feed by using a matching component, and the matching component is a matching circuit or an impedance tunable component; and
    the L-shaped arm corresponding to the slot structure on the metal frame forms one third antenna radiation arm, and the T-shaped arm corresponding to the slot structure on the metal frame forms two third antenna radiation arms.

14. The wireless electronic communications device according to claim 13, wherein
    when the second connection structure is on a first preset position on the third antenna radiation arm, the second connection structure, the third antenna radiation arm, the second mainboard spring plate, the matching component, and the feed form a third antenna; and
    when the second connection structure is on a second preset position on the third antenna radiation arm, the second connection structure, the third antenna radiation arm, the second mainboard spring plate, the matching component, and the feed form a fourth antenna.

* * * * *